Aug. 20, 1968 H. W. FORRER 3,397,623
METHOD OF MAKING AN ARTICLE CARRIER
Filed Dec. 5, 1966 3 Sheets-Sheet 1

INVENTOR
HOMER W. FORRER
BY *Walter M. Rodgers*
ATTORNEY

Aug. 20, 1968 H. W. FORRER 3,397,623
METHOD OF MAKING AN ARTICLE CARRIER
Filed Dec. 5, 1966 3 Sheets-Sheet 3

INVENTOR
HOMER W. FORRER
BY Walter N. Rodgers
ATTORNEY

United States Patent Office 3,397,623
Patented Aug. 20, 1968

3,397,623
METHOD OF MAKING AN ARTICLE CARRIER
Homer W. Forrer, Jonesboro, Ga., assignor to The Mead
Corporation, a corporation of Ohio
Filed Dec. 5, 1966, Ser. No. 599,176
9 Claims. (Cl. 93—36)

ABSTRACT OF THE DISCLOSURE

A carrier constructed according to this invention may comprise more or less conventional handle, side, end and bottom panels and may also include medial and transverse partitioning structure, the partitioning structure being in the form of at least one supplemental web which is adhered by a patterned application of glue to a main continuous web or to the supplemental web or webs. Following the securement of one or more supplement webs to the main web as described, both webs are passed through a single cutting and scoring die apparatus which by the provision of suitable cutting knives and scoring devices on one die element is adapted to cut both the main and supplemental webs and to score one of the webs. The other die element is provided with suitable scoring devices whereby the remaining web is scored simultaneously with the cutting and scoring operation performed on the other web by the other die element. In this manner a carrier is provided which can be either of the full depth or strap style without the necessity of modifying or adjusting the steps or apparatus utilized in the manufacture of the carrier. Furthermore, the procedure for manufacturing a carrier of the so-called laminated type is greatly expedited.

---

This invention relates to article carriers of the so-called laminated type wherein a main blank and one or more supplemental blanks are utilized to form the carrier. The invention is concerned with particular steps and the sequence thereof which are utilized in the formation of a laminated carrier.

A carrier of the laminated type is disclosed in U.S. patent application Ser. No. 445,096, filed Apr. 2, 1965. In this type of carrier a pair of identical blanks such, for example, as that disclosed and claimed in U.S. Patent 2,537,452, are first die-cut and then certain areas of the die-cut blanks are secured together. After being laminated certain other cutting operations may be performed. Thereafter the laminated blanks are manipulated by certain folding procedures and glued so as to form a completed carrier of the general type disclosed in Patent 2,537,452. Where webs are die-cut and scored separately and subsequently affixed to each other as by gluing operations, accurate and precise registry of one blank with respect to the other is obtained by synchronous machine operations.

As an alternative procedure, and as is explained in the aforementioned patent application Ser. No. 445,096, main and supplemental webs may be secured together and subsequently die-cut and scored in the desired manner.

A principal object of this invention is to provide an improved carrier and more particularly to formulate an improved method for making a carrier of the laminated type wherein all die-cutting and scoring operations on both main and supplemental blanks are performed quickly and efficiently with a single die operation.

Another object of this invention is the provision of an improved method of making an article carrier of the laminated type wherein one die element cooperates with another die element in such a way that all cutting operations on both blanks are performed by one die element and wherein all scoring operations on at least one of the blanks are performed by the other die element and thus to expedite all manufacture of such a carrier.

Still another object of this invention is to provide an improved carrier of the laminated type and an improved method of making such a carrier whereby the same carrier structure and method of operation may be employed irrespective of whether a carrier having shallow partitions of the so-called strap-style is to be made or a carrier having deep partitions of the so-called full depth type is desired.

Figure 1:
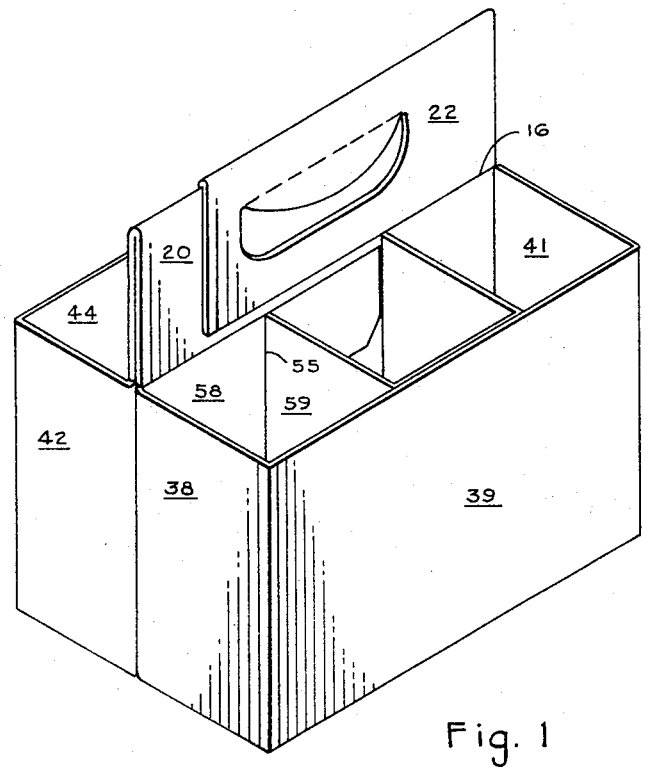
Figure 4:
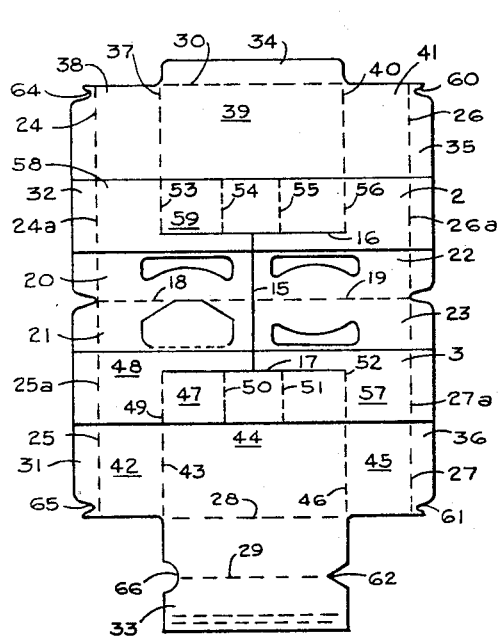
Figure 3:
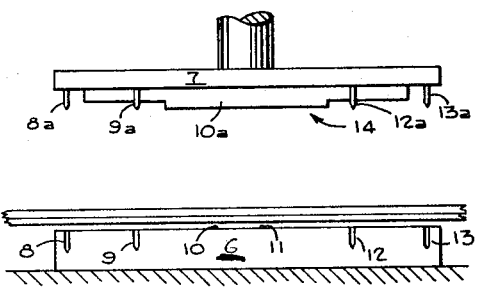
Figure 2:
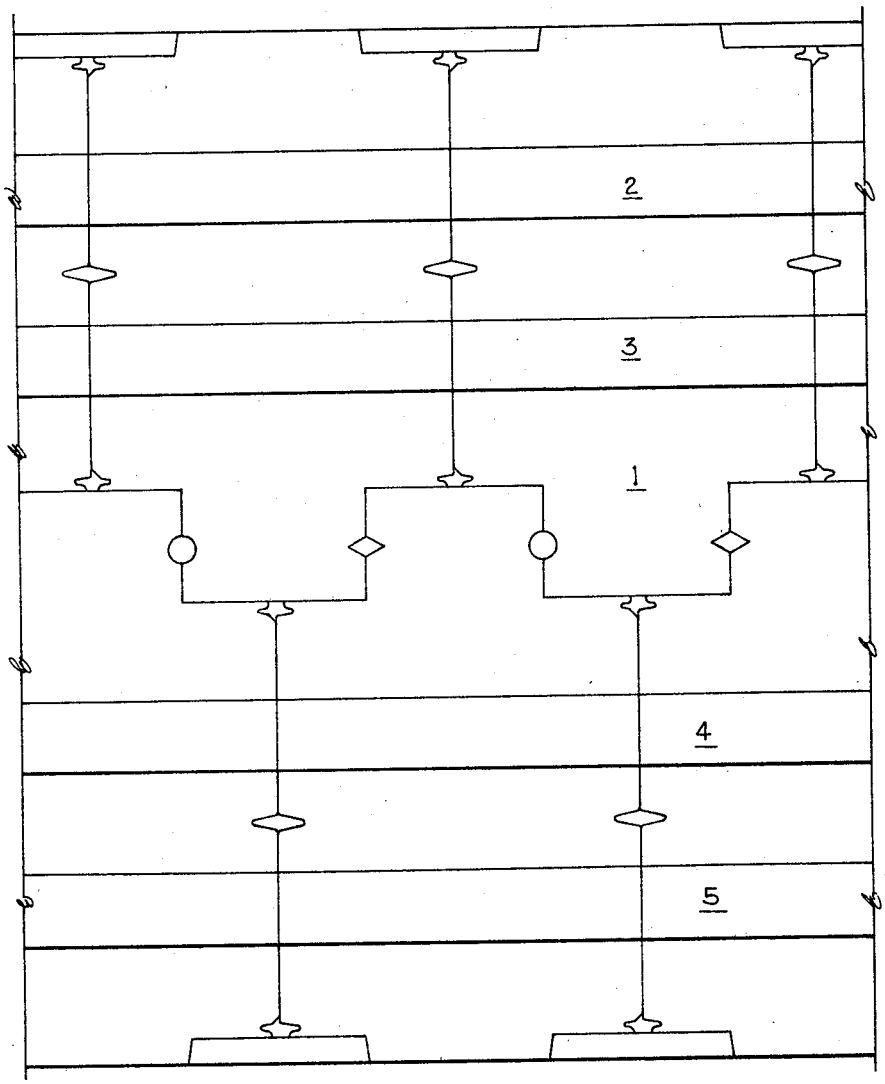

For a better understanding of the invention reference may be had to the following detailed description taken in conjunction with the accompanying drawings in which FIG. 1 is a perspective view of a completely set-up carrier constructed according to this invention; FIG. 2 is a fragmentary view of a main web and of a plurality of supplemental webs affixed thereto and which structure is passed through a pair of relatively movable die elements which are utilized in a particular manner according to this invention; FIG. 3 is a schematic side view of a pair of relatively movable die elements together with a fragmentary representation of main and supplemental webs such as are depicted in FIG. 2; FIG. 4 is a plan view of a composite blank comprising a single main blank and a pair of supplemental blanks, the arrangement of FIG. 4 being struck from the continuous web depicted in FIG. 2 by the die mechanism depicted schematically in FIG. 3; and in which FIGS. 5, 6, 7 and 8 simply depict the folding and gluing operations through which the composite blank of FIG. 4 is manipulated in order to form a completed and collapsed carrier as depicted in FIG. 8.

Generally speaking the exterior load bearing portions of the completed carrier as depicted, for example, in FIG. 1 are formed of material which is thicker and more durable than is the material from which the internal partitioning elements are formed. Thus the main web depicted in FIG. 2 and designated by the numeral 1 is employed in constructing the main handle, side, bottom and end walls of the carrier. The main web 1 as is well understood in the art comprises a long sheet of material such for example as paperboard. Only a fragment of the web 1 is depicted in FIG. 2 and affixed thereto are a number of supplemental webs designated by the numerals 2, 3, 4 and 5.

In accordance with one facet of this invention the supplemental webs 2–5 are affixed to the main web 1 by a patterned application of glue to web 1 or to the supplemental webs 2–5 or to both. The patterned application of glue of course is such that certain portions of the finished carrier which require that elements of the supplemental webs be affixed to certain areas of the main web are determinative of the locations of glue applications. Of course those areas of web 1 and of the supplemental webs 2, 3, 4 and 5 which must separate during the formation, manufacture or use of the carrier are left without an application of glue. Ordinarily, the portion of the main web 1 as depicted in FIG. 2 would constitute enough material to make two parallel rows of carrier blanks when disposed end to end in a transverse orientation relative to the main web 1. Thus the upper part of web 1 and the supplemental webs 2 and 3 are used to form one row of blanks and the lower portion of the web 1 in conjunction with supplemental webs 4 and 5 are utilized to form another row of composite carrier blanks of the type depicted for example in FIG. 4.

After the supplemental webs 2–5 inclusive are affixed by patterned gluing to the main web 1, the composite web is fed between relatively movable die elements shown schematically in FIG. 3 and designated by the numerals 6 and 7. As is apparent in FIG. 3, a plurality of scoring devices 8, 9, 10, 11, 12 and 13 are formed atop the die element 6 while a plurality of cutting and scoring devices generally designated at 14 are affixed to the bottom surface of movable die element 7. The orientation of the cutting and scoring elements 8–13 is chosen in accordance with the particular style of carrier being manufactured and also in accordance with the dimensional requirements of the blank. In FIG. 3 scoring devices 10 and 11 directly engage the webs 2–5 and cooperate with devices 10a and 11a while devices 8a, 9a, 12a and 13a directly engage main web 1 and cooperate with devices 8, 9, 12 and 13 respectively. Of course cutting and scoring elements as such are well known and as such do not constitute a main facet of the invention.

In accordance with this invention the blank depicted in FIG. 4 is formed by a single operating stroke of the movable die 7. More specifically the web as depicted in FIG. 2 is turned over and fed between the die elements 6 and 7. After the element 7 is moved downwardly and up again the blank as depicted in FIG. 4 is formed. Of course after the die operation the blank depicted in FIG. 4 is upside down from that depicted in FIG. 3. Stated otherwise, the main web 1 is preferably the upper layer whereas the supplemental blanks 2, 3, 4 and 5 occupy the lower position as depicted in FIG. 3. The supplemental webs of FIGS. 2 and 4 are shown atop the main web 1 for the sake of clarity and also because the orientation shown in FIG. 4 is normal for the beginning of the first gluing and folding operation in order to complete the carrier. It is to be understood that the webs 1–5 could be run through the die of FIG. 3 without turning the web upside down if desired. With the arrangement depicted in FIG. 3 the die elements generally designated at 14 perform all the cutting operations shown in the arrangement of FIG. 4 as well as a number of scoring operations insofar as the main web 1 and supplemental webs 2–4 are concerned. The lower die element 6 through the die devices 8–13 inclusive performs various scoring operations on the main and supplemental webs such as 2 and 3. More specifically the entire exterior border of the composite blank as shown in FIG. 4 is formed by the cutter elements 14. In addition, cut lines 15, 16 and 17 are formed by cutting knives which form portions of the die devices generally designated at 14. Cut lines 15, 16 and 17 of course extend completely through the main web 1 and completely through the supplemental webs 2 and 3. Scoring elements forming portions of die structure 14 also define fold lines 18 and 19. Score line 18 defines a pair of handle panels 20 and 21 while score line 19 defines a pair of handle panels 22 and 23. Suitable hand-hold apertures are provided in all these handle panels in a manner well known in the art.

Suitable scoring elements forming parts of die structure 14 also form the score lines 24, 25, 26, 27, 28, 29 and 30. As is well known, score line 25 defines a riser panel 31 foldably joined to handle panel 21 and score line 24 defines a riser panel 32 which is foldably joined to the left hand end of handle panel 20. Buttom panel 33 is defined by score line 28 and is provided with a medial fold line 29 is as well known. Glue flap 34 is defined by score line 30 and cooperates with the lower edge of bottom panel 33 to form the bottom of the carrier as is well known. Riser panels 35 and 36 are defined by fold lines 26 and 27 and of course are foldably joined to the right hand end edges of handle panels 22 and 23 in a manner well known in the art.

The side and end walls of the structure are also defined by the single stroke of the die and fold lines defining these panels form portions of scoring devices generally designated by the numeral 14. For example, score line 37 forms a foldable juncture between end panel 38 and side wall 39 while score line 40 forms a foldable juncture between side wall 39 and end panel 41. Of course, end panel 38 is foldably joined to riser panel 32 by the score line 24 and end panel 41 is foldably joined to riser panel 35 by the score line 26.

On the other side of the carrier end panel 42 is foldably joined along score line 43 to side wall 44 while end panel 45 is foldably joined to side wall 44 along fold line 46, it being understood that end panel 42 is foldably joined to riser panel 31 along fold line 25. In like fashion end panel 45 is foldably joined to riser panel 36 along fold line 27. Of course, score lines 43 and 46 are formed by scoring elements forming parts of the die structure generally designated by the numeral 14.

It is obvious that the portion of score line 24 which is immediately adjacent handle panel 20 and which is designated by the numeral 24a extends through both the main panel 1 and the supplemental web 2. Thus elements 8 and 8a forming scoring devices and constituting a part of the die structure 14 and 6 perform a series of slits in the portion 24a of both the main web 1 and the supplemental web 2. Likewise the score line 25a is formed in both the main web portion 1 and the supplemental web 3 by structure 8a forming a part of die element 14 and by device 9 on die element 6. Similarly score lines 26a and 27a are formed in both the main web 1 and the supplemental webs 2 and 3 by elements 13 and 13a constituting parts of the die devices generally designated at 14 and at 6.

If desired scores 50, 51, 54 and 55 could be formed by perforated slits cut through both webs 1, 2 or 3 by cutter devices mounted on movable die 7 and forming parts of structure 14. This would result in perforations in side walls 39 and 44 which would serve no purpose but which would not be objectionable. The fold line 49 must be formed in main web 1 and in supplemental web 2. In view of this fold line such as 49 is formed in webs 1 and 2 by suitable scoring devices such as are designated by the numerals 9 and 9a in FIG. 3.

In like fashion fold lines 52 of supplemental web 3 are formed in the main web 1 and consequently in accordance with a facet of the invention are formed by scoring elements 12 and 12a which form parts of the die elements 6 and 7.

With respect to web 2 and score lines 53 and 56 are formed by suitable scoring elements such as 9, 9a, 12 and 12a respectively.

The score lines 50 and 51 are formed only in supplemental web 2 and are formed by die devices 10, 10a and 11. Lines 54 and 55 are similarly formed in accordance with a feature of the invention.

The portion of main web 3 between lines 49 and 50 constitutes a transverse part as does the portion between lines 51 and 52. These are partitioning elements and of course if the web 3 is relatively wide will result in the formation of a so-called full-depth carrier whereas if web 3 is narrow the transverse partition parts will simply constitute "straps."

The part of web 3 which is disposed between lines 50 and 51 is secured to side wall 44 while the part of web 3 designated by the numeral 48 constitutes a medial partition part as does the part of web 3 designated by the numeral 57 and which is disposed between the fold lines 52 and 27a.

From the description thus far it will be understood that cut lines such as 15 in part extend through both webs and hence are cut by the structure 14.

The cut line 16 as shown in FIG. 4 extends from the fold line 53 to the fold line 56 insofar as the supplemental web 2 is concerned. It is also apparent from FIGS. 1 and 8 that the cut line 16 must of necessity extend from the fold line 24a to the fold line 26a insofar as the main web 1 is concerned. Stated otherwise, in the main web the cut line between the lower edge of handle panel 22 severs the handle panel 22 from the upper edge of the end wall 41 and the upper edge of side wall 39. Thus in accordance with another facet of the invention cutting elements disposed on movable die element 7 must be specially constructed so as to extend completely through the supplemental web 2 and the main web 1 insofar as the portion of the line 16 between fold lines 53 and 56 is concerned but that the portion of the cut line 16 which extends between the fold lines 56 and 26a and the portion which extends between the fold line 53 and 24a are formed only in the main web 1 and not in the supplemental web 2 or 3.

In order to form a completed carrier from the composite blank depicted in FIG. 4 an application of glue is made as indicated by stippling to the handle panels 20, 21 and to the riser panels 31 and 32. Thereafter riser panels 31 and 32 are folded upwardly and toward the right along the fold lines 24a and 25a respectively so that the carrier then appears as depicted in FIG. 5.

Figure 5:
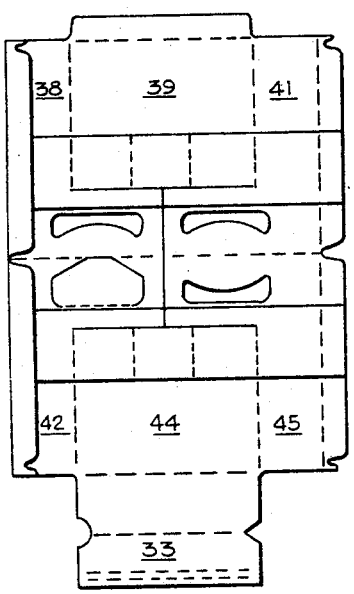
Figure 6:
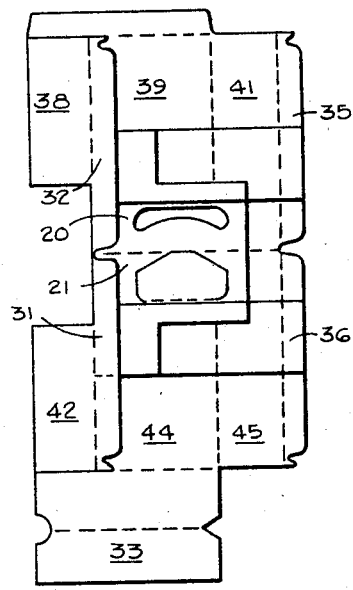

Since the folding operation whereby the structure of FIG. 5 is manipulated into the condition depicted in FIG. 6 requires that medial partition parts 48 and 58 be manipulted upwardly along with handle panels 20 and 21 in a manner well known in the art, folding along fold lines 49 and 53 in the desired direction must be insured. Thus in accordance with another facet of the invention the dimensional relationship of the parts such for example as 48, 47 and 49 are chosen so that when the riser panels 31 and 32 are folded into the position depicted in FIG. 5 the medial partition part 48 and the transverse partition part 47 buckle upwardly into spaced relation with the end panel 42 and the side panel 44 respectively along the fold line 49. Similarly buckling of transverse part 59 and of medial partition part 58 is effected along fold line 53. If desired this action could be accomplished via suction cups or otherwise.

After the aforementioned buckling is accomplished due to the folding of the parts into the positions shown in FIG. 5, glue is applied as indicated by stippling in FIG. 5 and the end panels 38 and 42 are swung upwardly and toward the right along the fold lines 37 and 43. Of course this folding operation elevates the handle panels 20 and 21 and positively moves the medial partition parts 48 and 58 toward the right while swinging the transverse partition parts 47 and 59 about fold lines 49 and 53, so that upon completion of this operation the parts occupy the positions depicted in FIG. 6.

Figure 7:
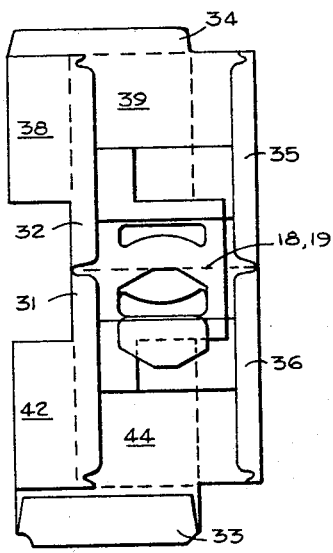
Figure 8:
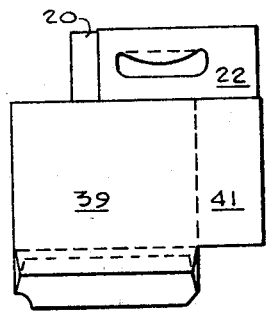

Thereafter an application of glue is made to the arrangement as depicted in FIG. 6 as indicated by stippling in that figure following which riser panels 35 and 36 are folded upwardly and toward the left along the fold lines 26 and 27 respectively and the bottom 33 is collapsed along line 29 so that the parts then occupy the positions depicted in FIG. 7.

An application of glue is then made to the parts as indicated by stippling in FIG. 7 and the blank is folded along the medial fold lines 18 and 19 to occupy the position depicted in FIG. 8. Of course, the glue lap 34 during this operation becomes affixed to the exposed edge of bottom panel 33 and the various riser and handle panels are secured in the face contacting relation to each other.

In order to set the carrier up, it is only necessary to hold the side walls in fixed positions against movement toward the left and then to exert a force toward the left against the end panels 41 and 45.

The carrier is maintained in set-up condition in a manner well known in the art due to the fact that locking notches 60 and 61 formed in riser panels 35 and 36 are disposed in coincidence to each other and cooperate with the locking notch 62 formed in the bottom panel 33. Locking notches 64 and 65 cooperate with the notch 66 at the other end of the carrier.

From the description above it is obvious that by the invention the same procedure may be used to form a so-called strap style carrier in which the supplemental webs such as 2 and 3 are relatively narrow and also to form a full depth type of carrier in which the supplemental webs 2 and 3 extend all the way from the top edge of a side wall such as 39 substantially down to the bottom edge thereof. Furthermore it is apparent that a simplified single die cutting operation is provided according to this invention whereby certain elements on the die element 6 operate on webs such as 2 and 3 while other cutting and scoring elements on die element 7 such as are generally designated at 14 may be utilized to cut both webs or to score both webs. In this manner production of the carrier is greatly expedited and a resultant carrier is provided which utilizes relatively strong and durable material from which main web 1 is constructed and which may utilize anchoring material from which webs 2, 3, 4 and 5 are constructed. The webs 2, 3, 4 and 5 simply constitute primarily cushioning partitions rather than load bearing elements.

While a particular embodiment of the invention has been shown and described, it will be understood that the invention is not limited thereto and it is intended in the appended claims to cover all such changes and modifications as fall within the true spirit and scope of the invention.

The embodiments of the invention in which an exclusive property or privilege is claimed are defined as follows:

1. A method of making a compartmented article carrier from a main web and a supplemental web comprising the steps of applying adhesive material to at least one of said webs in a predetermined pattern, pressing said webs into face contacting relation with each other to secure said webs to each other in accordance with the adhesive pattern, and die cutting and scoring both said main and supplemental webs simultaneously with a single operation of a pair of cooperating die elements.

2. A method according to claim 1 wherein certain cut lines are formed simultaneously and coincidentally in both blanks and wherein at least one cut line is formed in only one of said blanks.

3. A method according to claim 1 wherein said main and supplemental webs are interposed between a pair of relatively movable die elements, each of said elements being effective directly to engage one of said webs and to perform a die operation thereon.

4. A method according to claim 3 wherein at least one of said die elements is arranged to perform a cutting operation on both of said webs.

5. A method according to claim 4 wherein the other of said elements is arranged to perform a scoring operation on one of said webs.

6. A method according to claim 1 wherein said main web after cutting and scoring by the die comprises a handle panel, a riser panel, and end panel and a side wall and wherein said supplemental web comprises parts affixed to said riser and handle panels and a free medial partition part integral with the part affixed to said handle panel and a free transverse partition part foldably joined to said free medial partition part, certain cutting operations on both webs being performed by cutting devices on one die element and certain scoring operations being performed on only one web by scoring devices on the other die element.

7. A method according to claim 6 wherein a single stroke of the die severs the lower edge of said handle panel from the upper edges of said end and side walls and also severs said transverse partition part but not said medial partition part from the part of said supplemental web which is secured to said handle panel.

8. A method according to claim 6 wherein said supplemental web also comprises a part foldably joined to said transverse partition part and which is affixed to said main web.

9. A method according to claim 8 wherein said riser panel and the part of said supplemental web which is secured thereto are folded into flat face contacting relation with said handle panel and with said end panel and wherein said medial and transverse partition parts are caused to buckle into spaced relation relative to said side and end walls due to folding of said riser panel and said part of said supplemental web.

References Cited

UNITED STATES PATENTS

| | | | |
|---|---|---|---|
| 3,203,324 | 8/1965 | Gentry | 93—36 |
| 3,292,513 | 12/1966 | Palmer | 93—58 |

BERNARD STICKNEY, *Primary Examiner.*